N. P. MIX.
Wind-Wheel.
No. 127,261. Patented May 28, 1872.
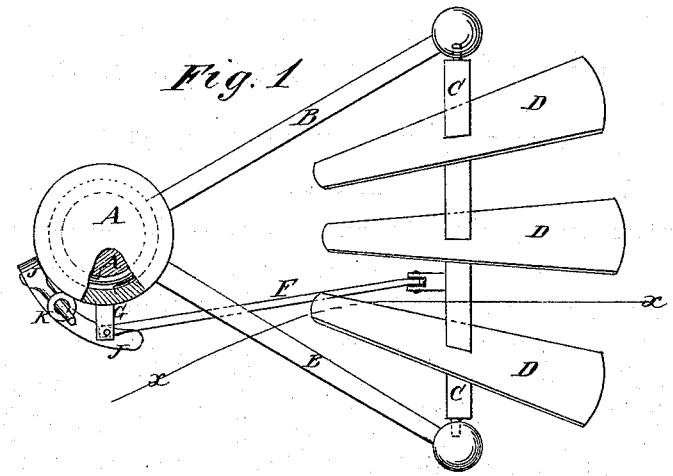
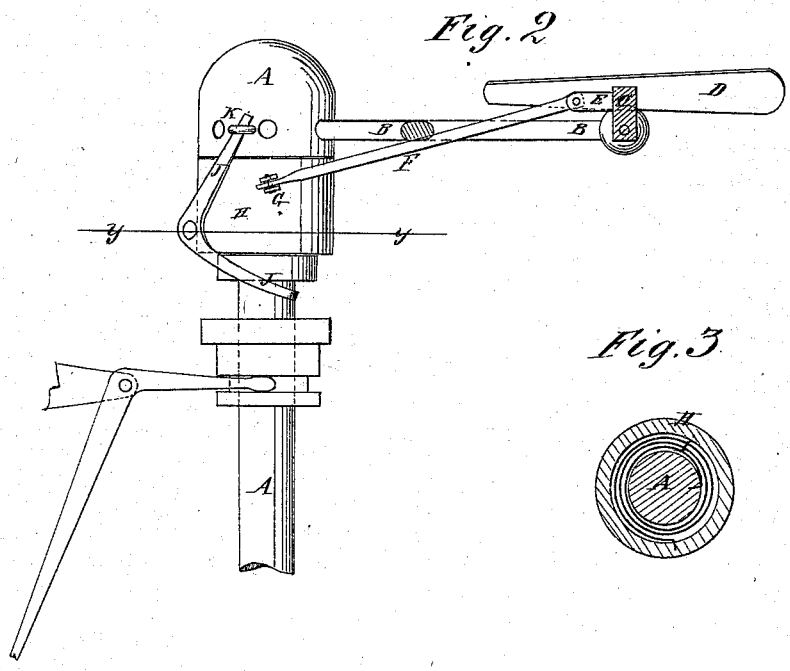
Witnesses:
A. W. Almqvist
N. A. Graham
Inventor:
N. P. Mix
per _____ Attorneys.

127,261

UNITED STATES PATENT OFFICE.

NEWELL P. MIX, OF COLUMBUS, OHIO.

IMPROVEMENT IN WIND-WHEELS.

Specification forming part of Letters Patent No. 127,261, dated May 28, 1872.

Specification describing a new and useful Improvement in Wind-Wheel, invented by NEWELL P. MIX, of Columbus, in the county of Franklin and State of Ohio.

Figure 1 is a front view of a segment of my improved wind-wheel. Fig. 2 is a side view of the same, partly in section, through the line $x\,x$, Fig. 1. Fig. 3 is a detail cross-section of the oscillating hub taken through the line $y\,y$, Fig. 2.

Similar letters of reference indicate corresponding parts.

My invention has for its object, to improve the construction of wind-wheels, so as to enable them to be more conveniently controlled, and make them more reliable in operation; and it consists in the construction and combination of various parts of the wheels, as hereinafter more fully described.

A is the horizontal shaft, to the outer end of which the sails are attached, and which revolves in bearings pivoted to the top of the tower or frame in the ordinary manner, and is provided with gearing in the ordinary manner for transmitting the motion to the machinery to be driven. To the outer end of the shaft A are attached the wings, six, more or less, in number, and one of which I will describe. B are radial arms, the inner ends of which are securely attached to the outer end of the shaft A, or to a stationary hub attached to said end. To the outer ends of the arms B are pivoted the ends of a bar, C, to the forward edge of which are attached the fans or sails D. The pivots of the bar C are arranged at the rear edge of the ends of the bar C, so that the centrifugal force engendered by the revolution of the wheel may tend to throw the wings out of the wind. To the inner side of the pivoted bar C, near its forward edge, is attached a short arm, E, to the outer end of which is pivoted the outer end of the connecting-rod F, the inner end of which is pivoted to the outer end of a short arm, G, attached to the hub H, which oscillates upon the shaft A. I is a spring placed within the hub H, and one end of which is connected with the said hub H. The other end of the spring I is attached to the shaft A, around which it is coiled in such a direction that its tension may tend to hold the sails to the wind. By this construction, by turning the hub H toward the tension of the spring I, the sails will be turned from the wind. The spring I may be of any suitable kind. J is a bent lever, which is pivoted at its angle or bend to the side of the hub H. The outer end of the lever J passes through an eye-bolt or staple, K, attached to the side of the end of the shaft A, or of the stationary hub attached to said end, and which serves as a fulcrum for said lever. The inner end of the lever J is inclined in such a direction that, when pressed toward the outer end of the shaft A, it may turn the hub H in such a direction as to turn the wings from the wind, the wings being again turned to the wind when the lever J is released by the tension of the spring I. The lever J is operated to turn the wings from the wind by a collar sliding upon the shaft A, and which is moved up against the said lever by a lever pivoted to some suitable support. The spring I may be omitted if desired, and the hub H may be turned to turn the wings to the wind by a sliding head upon the shaft A held up against an inclined plane upon the hub H by a weighted lever; or the bent lever J may be reversed and operated upon by a weighted lever. The wings may be turned from the wind other than by the bent lever J, by means of an inclined plane upon the hub H, and a sliding head worked against the inclined plane by means of a lever suitably pivoted, or knee-joints may be used instead of the bent lever J; or a friction-clutch can be applied and accomplish the same end. The oscillating hub H may have teeth formed upon its side meshing into a pinion upon the inner ends of wings radiating from the center and turning the wings to or from the wind.

Having thus described my invention, I claim as new, and desire to secure by Letters Patent—

1. The oscillating hub H for controlling the wings of a wind-wheel, substantially as herein shown and described.

2. The combination of the oscillating hub H, arms G, connecting-rod F, and arms E, with the shaft A and pivoted bar C, to which the fans or sails D are attached, substantially as herein shown and described, and for the purpose set forth.

3. The combination of a spring, I, with the shaft A, and hub H; for the purpose of turning and holding the wings to the wind, substantially as herein shown and described.

4. The combination of the bent lever J with the shaft A and hub H, for the purpose of turning the wings from the wind, substantially as herein shown and described.

5. The arrangement of the pivots of the bars C at the rear edge of the ends of said bars, substantially as herein shown and described, and for the purpose set forth.

NEWELL P. MIX.

Witnesses:
 JAMES C. DILLEY,
 EMMETT MIX.